UNITED STATES PATENT OFFICE.

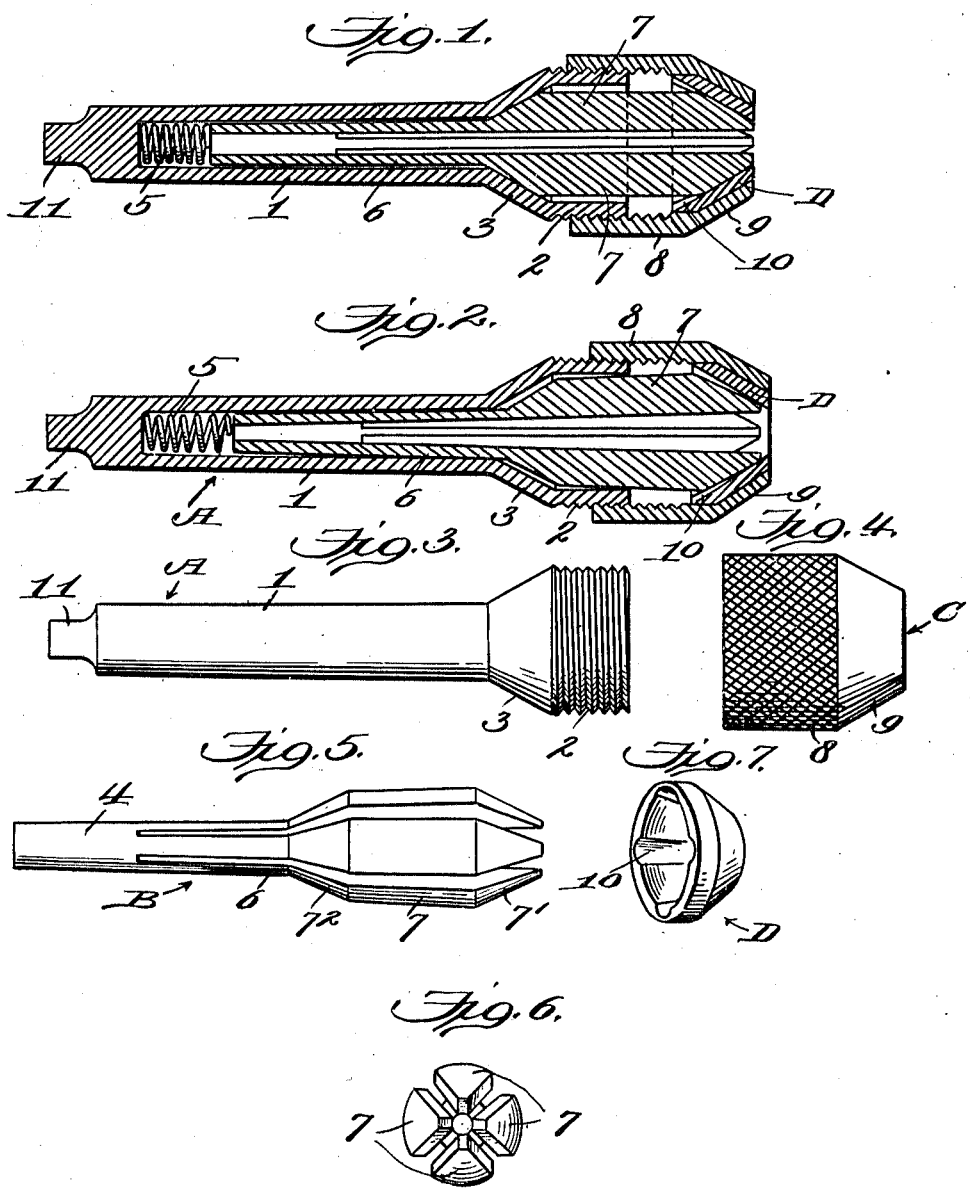

LEO S. WHITEHEAD, OF WHEELING, WEST VIRGINIA.

DRILL-CHUCK.

990,087.

Specification of Letters Patent. Patented Apr. 18, 1911.

Application filed June 4, 1910. Serial No. 565,072.

*To all whom it may concern:*

Be it known that I, LEO S. WHITEHEAD, a citizen of the United States, residing at Wheeling, in the county of Ohio and State of West Virginia, have invented new and useful Improvements in Drill-Chucks, of which the following is a specification.

The present invention has reference to improvements in drill chucks and tap-wrenches, and it comprehends generally the production of an implement wherein the tool holder and the head of the stock are so constructed as to coöperate in clamping the tool in place when the clamping sleeve is turned in the proper direction. It further, and more especially, resides in the provision of a thimble which is interposed between the sleeve above referred to and the front ends of the jaws of the tool holder, and is designed both to coact therewith in effecting the requisite clamping action of said jaws and to center and maintain the latter in equidistant relation.

A structural embodiment of the invention is illustrated in the accompanying drawing, wherein:

Figure 1 is a longitudinal sectional view of the improved implement, showing the clamping jaws in contracted position. Fig. 2 is a similar view, showing said jaws expanded. Figs. 3 and 4 are detail side elevations of the stock and sleeve, respectively. Fig. 5 is a similar view of the tool holder. Fig. 6 is an end view of Fig. 5. Fig. 7 is a perspective view of the thimble.

In said drawings, A and B indicate, respectively, the stock and tool holder, C the clamping sleeve and D the thimble. The element A comprises, essentially, a shank portion 1, and a head consisting of a cylindrical outer portion 2 and a frusto-conical or tapered inner or connecting portion 3, the former portion of said head being exteriorly threaded. This element is substantially hollow and receives within the bore of its shank the shank portion 4 of the tool holder B, the inner end of shank 4 terminating short of that of said bore so as to permit the interposition of a suitable expansible coil spring 5 within the intervening space, which spring tends to normally force the holder outwardly, as will be understood. The tool holder is likewise approximately hollow and is split longitudinally at equidistant intervals to provide a plurality of legs 6, the outer jaw portions 7 of which are thickened. The end portions 7' and 7² of these jaws are reversely tapered or beveled, the inclination of the inner end portions 7² being the same as that of the tapered portion 3 of the stock head. Said jaws normally maintain an open or expanded position due to the inherent resiliency of the metal from which the holder is constructed. To close or contact the jaws, so as to cause them to grip the shank of a drill, tap, or other suitable tool, (not shown), the sleeve C and thimble D are provided. The first element is, in the main, of conventional type and comprises an interiorly threaded cylindrical inner portion 8, and a frusto-conical outer portion or mouth 9, the former portion fitting upon the corresponding cylindrical portion 2 of the stock head. Thimble D is also frusto-conical, its taper or angularity corresponding to that of the outer end portions 7' of jaws 7, as well as to that of the mouth portion 9 of the sleeve, whereby it may be interposed between said portions in the manner shown in Figs. 1 and 2. Its inner surface or wall is formed at equidistant points with transverse depressions 10 corresponding in number to the number of jaws 7 and adapted to receive the noses of said jaws, the provision of these depressions tending to insure the accurate centering of the jaws and to maintain them in equidistant relation.

The stock shank 1 is formed with a terminal tang 11 of any desired construction.

In assembling the various parts, the spring 5 is first introduced into the stock bore, after which the shank of the tool holder is inserted therein. The thimble is next fitted within the sleeve, fitting in the seat produced by the mouth portion 9, and said sleeve then screwed onto the cylindrical outer portion 2 of the stock head. The shank of the proper tool may then be introduced through the alining open ends of the sleeve and thimble into the space between the inner faces of the clamping jaws 7, the latter being at that time in the open or expanded position shown in Fig. 2. To clamp the tool shank in place, it is only necessary to tighten the sleeve upon the threaded portion of the stock head in the ordinary manner, whereupon the engagement of the thimble with the front ends 7' of the jaws will gradually close the latter, and will also force the holder rearwardly against the pressure of spring 5. During this rearward movement, the coaction between the inclined portion 3 of the stock head and the rear or inner ends 7² of the jaws will likewise cause said jaws to bind against the tool shank, thus supplementing and materially assisting the afore-mentioned closing action effected by the coaction between the thimble and the jaw ends 7'. When the sleeve is turned in the opposite direction, the jaws will be free to resume their normal position, thereby releasing the tool, the holder being projected forward bodily by the expansion of the spring 5.

I claim as my invention:

1. A chuck comprising, in combination, a substantially hollow stock; a tool holder inserted in the bore thereof and formed with normally-expanded jaws having their free ends tapered; a clamping sleeve rotatably fitted on said stock; and a clamping member interposed between the outer end of the sleeve and said jaw ends and having a conical inner face formed with depressions wherein the latter are received, for centering the same and closing them when said sleeve is rotated in one direction.

2. A chuck comprising, in combination, a substantially hollow stock; a tool holder inserted in the bore thereof and formed with normally-expanded jaws having their free ends tapered; a clamping sleeve rotatably fitted on said stock; and a conical clamping thimble interposed between the outer end of the sleeve and said jaw ends and formed with depressions wherein the latter are received, for centering the same and closing them when said sleeve is rotated in one direction.

In testimony whereof I have hereunto set my hand in presence of two subscribing witnesses.

LEO S. WHITEHEAD.

Witnesses:
 JOHN R. ARBENZ,
 E. BALZER.